United States Patent [19]

Smyth et al.

[11] Patent Number: 4,749,490

[45] Date of Patent: Jun. 7, 1988

[54] CYCLONE SEPARATOR

[75] Inventors: Ian C. Smyth, Eastleigh; Martin T. Thew, Southampton, both of England

[73] Assignees: The British Petroleum Company p.l.c., London, England; B.W.N. Vortoil Rights Co. Pty. Ltd., Victoria, Australia

[21] Appl. No.: 89,438

[22] Filed: Aug. 26, 1987

[30] Foreign Application Priority Data

| | | | |
|---|---|---|---|
| Aug. 27, 1986 | [GB] | United Kingdom | 8620707 |
| Nov. 28, 1986 | [GB] | United Kingdom | 8628503 |

[51] Int. Cl.[4] .......... B01D 17/038

[52] U.S. Cl. .......... 210/512.1; 209/144; 209/211

[58] Field of Search .......... 210/739, 788, 512.1; 209/3, 18, 211, 144

[56] References Cited

U.S. PATENT DOCUMENTS

| | | | |
|---|---|---|---|
| 4,284,244 | 8/1981 | Hoover et al. | 209/18 |
| 4,378,289 | 3/1983 | Hunter | 210/512.1 |
| 4,587,024 | 5/1986 | Hayatdavoudi | 210/739 |
| 4,588,559 | 5/1986 | Emmett | 209/3 |
| 4,670,161 | 6/1987 | Hayatdavoudi | 209/144 |

*Primary Examiner*—Frank Sever

*Attorney, Agent, or Firm*—Morgan & Finnegan

[57] ABSTRACT

A cyclone separator comprises (a) an inlet portion having generally the form of a volume of revolution, and one or more inlet channels, (b) a vortex finder outlet coaxial with the inlet portion and projecting into the inlet portion, (c) a generally axially symmetrical converging separation portion adjacent to the inlet portion and on the opposite side from the vortex finder outlet, and, optionally (d) a downstream portion into which the separation portion converges. The geometry of each section is defined by a series of mathematical relationships.

9 Claims, 1 Drawing Sheet

CYCLONE SEPARATOR

Figure 1:
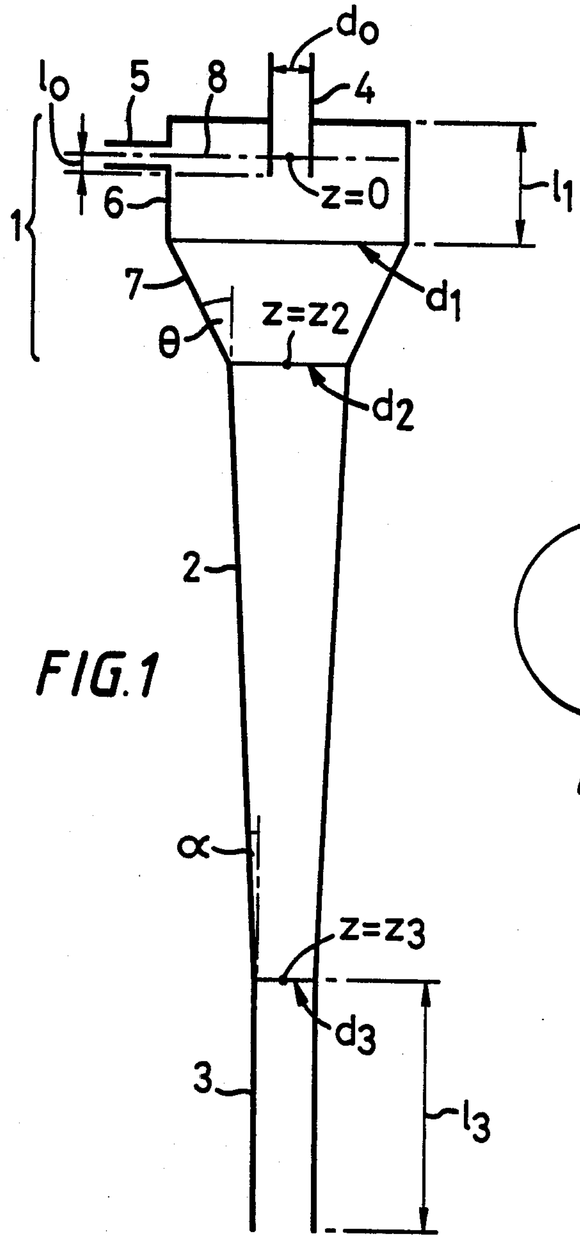

This invention relates to a cyclone separator for separating immiscible liquids of different densities, and more particularly to a cyclone separator for removing a smaller volume (e.g. up to 45% by volume of the total) of a heavier liquid, such as water, from a larger volume of a lighter liquid, such as oil, with minimum contamination of the latter. Most cyclone separators are for the purpose of separating heavy solids from a fluid and constraints on their operation are significantly different.

Paper E2 by Smyth, Thew and Colman presented at the Second International Conference on Hydrocyclones, Bath, England, Sept. 19–21, 1984, and reported on pages 177–190 of the Proceedings, discloses a hydrocyclone for such a purpose and suggests that a typical application might be the dewatering of light crude oil at the well head. The hydrocyclone comprises a cylindrical swirl generating chamber with large twin inlets injecting flow at a substantial distance from the axis, a vortex finder and a moderately tapered lower cone.

According to the present invention there is provided a cyclone separator comprising (a) an inlet portion having generally the form of a volume of revolution, and one or more inlet channels, (b) a vortex finder outlet, the overflow, coaxial with the inlet portion and projecting into the inlet portion, (c) a generally axially symmetrical coverging separation portion adjacent to the inlet portion and on the opposite side from the vortex finder outlet, and, optionally, (d) a downstream portion into which the separation portion converges, the following relationships (i)–(v) applying wherein $d_o$ is the minimum internal diameter of the vortex finder outlet within $3d_2$ of the inlet plane or at its end if this is not within $3d_2$ of the inlet plane, $d_1$ is the diameter of the cyclone in the inlet portion where the feed enters, neglecting any inlet channel, $d_2$ is the diameter of the cyclone where the inlet portion joins the separation portion, the junction being as hereinafter defined, $d_3$ is the diameter of the cyclone where the separation portion ends or joins the downstream portion, the junction being as hereinafter defined, $d_{ix}$ is twice the radius at which flow enters the cyclone through the $x^{th}$ inlet, (i.e., twice the minimum distance of the tangential component of the inlet centre line from the axis), $A_{ix}$ is the cross-sectional area of the $x^{th}$ inlet, as hereinafter defined, $$A_i = \sum_{x=1}^{n} A_{ix},$$

$$d_i = \frac{1}{A_i} \sum_{x=1}^{n} d_{ix} A_{ix},$$

$\alpha$ is the half angle of convergence of the separation portion as hereinafter defined:

(i) $8 \leqq \pi d_2 d_i / 4A_i \leqq 16$ (ii) $1° \leqq \alpha < 3°$, suitably $1\frac{1}{2}° \leqq \alpha < 3°$, conveniently $2° \leqq \alpha < 3°$ (iii) $0.25 < d_o/d_2 < 0.65$ (iv) $0.9d_1 > d_2$ (v) $0.9d_2 > d_3$ The inlet plane is defined as the plane perpendicular to the axis of the cyclone at the mean axial position of the weighted areas of the inlets such that the injection of angular momentum into the hydrocyclone is equally distributed axially about it and is thus such that $$\frac{1}{A_i d_i} \sum_{x=1}^{n} Z_x A_{ix} d_{ix} = 0,$$

wherein $Z_x$ is the axial position of the centre line of the $x^{th}$ inlet.

The junction of the inlet portion and the separation portion is defined as being at the axial position $z_2$ (measured away from the inlet plane where $z=0$) where the condition first applies that:

$$\tan^{-1} \frac{d_2 - d}{2(z - z_2)} < 3° \text{ for all } z > z_2,$$

where d is the cyclone diameter at z.

The junction of the separation portion and the downstream outlet portion, if present, is defined as the diameter at $z_3$ where $d/d_3 = 0.98$ for all $z > z_3$.

$\alpha$ is defined as $$\tan^{-1} \frac{d_2 - d_3}{2(z_3 - z_2)}$$

A suffix IX is the projection of the cross sectional area of the xth inlet measured at entry to the cyclone in the plane parallel to the cyclone axis which is normal to the plane, and also parallel to the cyclone axis, which contains the tangential component of the inlet centre line.

The vortex finder outlet preferably terminates within $3d_2$ of the inlet plane, this distance being defined as $1_o$.

Preferably the axial overflow outlet, ie, the vortex finder outlet, projects into the cyclone at least as far as the inlet plane.

The expression $\pi d_2 d_i / 4A_i$, termed the "swirl coefficient" and designated S, is a reasonable predictor of the ratio of velocities tangentially:axially of flow which has entered the cyclone and which has reached the plane of $d_2$.

The or each inlet channel is preferably fed from a duct directed substantially tangentially into the inlet portion. Each inlet channel may spiral inwardly in a volute entry. The outer surface of the channel may converge to the diameter of the inlet portion $d_1$ after 360°/n around the axis, wherein n is the number of feed channels.

The inlet channel(s) need not be in a plane normal to the axis and may be offset in a generally helical form. They may attain the diameter $d_1$ after more than 360°/n around the axis. If the inlet portion is itself conical, then the diameter will be approximately $d_1$.

The convergence averaged from the diameter $d_1$ measured in the inlet plane to the diameter $d_2$ may have the greatest cone half-angle $\theta$ in the cyclone, which may be in the range 5° to 45°.

The dimensions of the inlet portion should be such that the angular momentum of feed entering from the inlets is substantially conserved into the separation portion.

Preferably $d_3/d_2$ is less than 0.70 and more preferably less than 0.55.

Preferably $d_3/d_2$ is greater than 0.20 and more preferably greater than 0.25.

Preferably where the internal length of the downstream outlet portion, if present, is $l_3$, $l_3/d_3$ is $>1$.

For space reasons, it may be desired to curve the downstream outlet gently, and gentle curvature of the cyclone axis is feasible.

$d_2$ may be regarded as the cyclone diameter and for many purposes can be within the range 10 to 100 mm. With excessively large $d_2$, the energy consumption becomes large to maintain effective separation while with too small $d_2$, unfavourable Reynolds number effects and excessive shear stresses can arise.

Pressure drop in the vortex finder should not be excessive, and therefore the length of the "$d_o$" portion of the vortex finder should be kept low. The vortex finder may reach its "$d_o$" diameter instantaneously or by any form of abrupt or smooth transition, and may widen thereafter by a taper or step.

Externally, the vortex finder may blend smoothly into the end of the cyclone or may remain cylindrical. It may also carry a skirt or be enlarged towards the end to reduce short circuit flow.

It is possible for at least part of the generator of the inlet portion or of the separation portion or of both to be curved. The generator may be, for example, (i) a monotonic curve (having no points of inflexion) steepest at the inlet-portion end and tending to a cone-angle of zero at its open end, or (ii) a curve with one or more points of inflexion but overall converging towards the downstream outlet portion, preferably never diverging towards the downstream outlet portion.

The cyclone separator is equally effective in any orientation and may be staged in series to improve overall separation. Staging may be applied to either or both outlet streams.

According to another aspect of the present invention there is provided a method for separating a more dense phase from a larger volume of a less dense phase which method comprises supplying a feedstock containing the mixture of the phases to the inlet channel(s) of a cyclone separator as hereinbefore described and recovering an enhanced concentration of the less dense phase from the vortex finder outlet and an enhanced concentration of the more dense phase from the downstream outlet.

The method is particularly suitable for separating water from oil and in particular, produced water from crude oil, an operation known as dewatering.

The water content can be up to 45% by volume of the total mixture, depending on the nature of the oil.

The split ratio of the cyclone separator may be defined as $$\frac{\text{volumetric flow rate through downstream outlet}}{\text{volumetric flow rate through inlet}}$$

The split ratio has a minimum value for successful separation which is determined by the geometry of the cyclone, the inlet water concentration, the size distribution of the water droplets and the properties of the oil and water. The cyclone should be operated above this minimum value. This can be achieved by controlling the back pressure by valves or flow restrictions outside the cyclone.

Preferably the split ratio is arranged to exceed 1.2 $K_i$ where $K_i$ is the inlet water content by volume. For optimum performance this may need to be varied as $K_i$ changes.

As liquids normally become less viscous when warm, the method is advantageously performed at as high a temperature as convenient.

Figure 2:
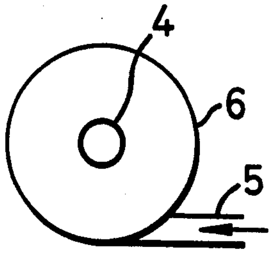

The invention will now be described by way of example with reference to the accompanying drawings, in which:

FIG. 1 shows, schematically, a cross-section taken on the axis of a cyclone separator according to the invention, and FIG. 2 is a view down the axis of the cyclone separator. The drawings are not to scale.

A cyclone separator comprises an inlet portion 1, a separation portion 2, a downstream portion 3 and a vortex finder outlet 4, all being coaxial.

The inlet portion 1 is supplied by a single tangential inlet channel 5 and consists essentially of two sections, a cylindrical section 6 of diameter $d_1$ and length $l_1$ and a frusto-conical section 7 reducing in diameter from $d_1$ to $d_2$. $d_2$ is regarded as the cyclone diameter. The half angle of taper is θ.

The separation portion 2 is a narrowly tapering cylinder the diameter of which reduces from $d_2$ where it adjoins the frusto-conical section 7 to $d_3$ where it adjoins the downstream portion 3. The half angle of taper is $\alpha$.

The downstream portion 3 is a cylinder of diameter $d_3$ and length $l_3$.

The vortex finder outlet is a cylinder of internal diameter $d_o$ which projects beyond the axial plane of the inlet 8.

In the cyclone separator described, dimensions are rounded to the nearest millimeter and relationships are as follows:

$d_2$ is taken as the standard diameter and is 36 mm.
$d_o=0.28d_2=10$ mm
$d_1=1.94d_2=69$ mm
$d_3=0.27d_2=10$ mm
$l_1=1.9d_2=68$ mm
$l_3=2d_2=70$ mm
$l_o=0.38d_2=-$mm
diameter of circular inlet$=0.36d_2=13$ mm
distance of axis of inlet below top of inlet chamber$=0.18d_2=6.5$ mm
$\theta=40°$
$\alpha=2°$
$S=\pi d_i d_2/4A_i=12$.
$0.9d_1=62$
$0.9d_2=32$

EXAMPLE 1

The cyclone described above was operated at approximately 20° C. with kerosine containing dispersions of water at an overall throughput of 45 l/min. At a split ratio of 40% an inlet water content of 25% by volume (mean drop size 115 um) was reduced to 0.14% in the overflow outlet while at a split ratio of 10% an inlet water content of 5% (mean dropwise 45 um) was reduced to 0.13% in the overflow outlet. The pressure drops to the overflow outlet were 2 bar and 1.5 bar respectively.

EXAMPLES 2 & 3

Further tests were carried out with a cyclone the same as in Example 1 except that $\alpha=1\frac{1}{2}°$. Operating conditions and results are set out in the accompanying Table.

| EX | OIL TYPE | NATURE OF WATER/ OIL SYSTEM | DEWATERING PERFORMANCE FOR $K_i \leqq 30\%$ at OPTIMUM SPLIT | OPERATING RANGE FOR BEST DE-WATERING (see adjacent column) FLOWRATE (l/min) | PRESSURE DROP (bar) |
|---|---|---|---|---|---|
| 2 | Kerosine $\nu \simeq 2$ cSt $\rho \simeq 780$ kgm$^{-3}$ | drops readily coalesce, low surfactant levels; $\gamma = 23\text{-}28$ mN m$^{-1}$ | $K_u \leqq 0.4\%$ [$d_i = 45 \rightarrow 130\mu$ as $K_i = 5 \rightarrow 30\%$] | 40-75 | 1.1-3.5 |
| 3 | Kerosine/Heavy Gas Oil Blend $\nu \simeq 4$ cSt $\rho \simeq 820$ Kgm$^{-3}$ | restricted drop coalescence rate, moderate surfactant levels; $\gamma \simeq 23$ mN m$^{-1}$ | $K_u/K_i \leqq 0.13$ [$d_i = 25\text{-}70\mu$ as $K_i = 5 \rightarrow 30\%$] | 37-57 | 0.7-2.5 |

$K_i$ inlet water concentration (vol)
$K_u$ upstream or overflow water concentration (vol)
$d_i$ mean drop size at inlet
$\gamma$ interfacial tension
$\nu$ kinematic viscosity
$\rho$ density
Test Temperatures: 20-25° C.

The following Table shows examplary geometries for further cyclone separators constructed in accordance with the invention.

| | A | B | C |
|---|---|---|---|
| $d_2$ | 35.0 mm | 35.0 mm | 35.0 mm |
| $d_o/d_2$ | 0.420 | 0.280 | 0.420 |
| $A_i$ | 126 mm$^2$ | 192 mm$^2$ | 192 mm$^2$ |
| $d_3/d_2$ | 0.268 | 0.268 | 0.500 |
| $d_1/d_2$ | 1.98 | 1.74 | 1.74 |
| $l_o/d_2$ | 0.38 | 0.41 | 0.41 |
| $l_1/d_2$ | 1.94 | 1.00 | 1.00 |
| $l_3/d_2$ | 1.35 | 1.35 | 2.50 |
| $\theta$ | 45° | 45° | 20° |
| $\alpha$ | 1.5° | 1.5° | 1.5° |
| Swirl co-efficient | 12.0 | 9.8 | 9.8 |
| Inlet type | single, tangential, circular | single, volute, rectangular 3:1 | single, volute, rectangular 3:1 |

A, B and C relate specifically to cyclone separators suitable for handling mixture of 5% water in oil, 20% water in oil and 40% water in oil, respectively.

We claim:

1. A cyclone separator comprising
(a) an inlet portion having generally the form of a volume of revolution, and one or more inlet channels,
(b) a vortex finder outlet coaxial with the inlet portion and projecting into the inlet portion,
(c) a generally axially symmetrical converging separation portion adjacent to the inlet portion and on the opposite side from the vortex finder outlet, characterised by the fact that the following relationships (i)-(v) apply wherein
$d_o$ is the minimum internal diameter of the vortex finder outlet within $3d_2$ of the inlet plane or at its end if this is not within $3d_2$ of the inlet plane,
$d_1$ is the diameter of the cyclone in the inlet portion where the feed enters, neglecting any inlet channel,
$d_2$ is the diameter of the cyclone where the inlet portion joins the separation portion,
$d_3$ is the diameter of the cyclone where the separation portion ends,
$d_{ix}$ is twice the radius at which flow enters the cyclone through the $x^{th}$ inlet,
$A_{ix}$ is the cross-sectional area of the $x^{th}$ inlet, as hereinbefore defined, $$A_i = \sum_{x=1}^{n} A_{ix},$$

$$d_i = \frac{1}{A_i} \sum_{x=1}^{n} d_{ix} A_{ix},$$

and
$\alpha$ is the half angle of convergence of the separation portion (2) as hereinbefore defined:
(i) $8 \leqq \pi d_2 d_i / 4A_i \leqq 16$
(ii) $1° \leqq \alpha < 3°$
(iii) $0.25 < d_o < 0.65$
(iv) $0.9d_1 > d_2$
(v) $0.9d_2 > d_3$.

2. A cyclone separator according to claim 1 wherein $2° \leqq \alpha < 3°$.

3. A cyclone separator according to claim 1 wherein $1\tfrac{1}{2}° \leqq \alpha < 3°$.

4. A cyclone separator according to claim 1 comprising a downstream portion into which the separation portion converges.

5. A cyclone separator according to claim 1 wherein the vortex finder outlet terminates within $3d_2$ of the inlet plane.

6. A cyclone separator according to claim 1 wherein the or each inlet channel is fed from a duct directed substantially tangentially into the inlet portion.

7. A cyclone separator according to claim 1 wherein $d_3/d_2$ is in the range 0.20 to 0.70.

8. A cyclone separator according to claim 7 wherein $d_3/d_2$ is in the range 0.25 to 0.55.

9. A cyclone separator according to claim 4 wherein $l_3/d_3$ is greater than 1, wherein $l_3$ is the internal length of the downstream outlet portion.

* * * * *

UNITED STATES PATENT AND TRADEMARK OFFICE
CERTIFICATE OF CORRECTION

PATENT NO. : 4,749,490

DATED : June 7, 1988

INVENTOR(S) : Ian C. Smyth and Martin T. Thew

It is certified that error appears in the above-identified patent and that said Letters Patent is hereby corrected as shown below:

Column 6, line 38, "(iii) $0.25 < d_o < 0.65$" should be

--(iii) $0.25 < d_o/d_2 < 0.65$--.

Signed and Sealed this

Seventh Day of May, 1991

*Attest:*

HARRY F. MANBECK, JR.

*Attesting Officer* *Commissioner of Patents and Trademarks*